US012749110B2

(12) United States Patent
Ananthakrishnan

(10) Patent No.: US 12,749,110 B2
(45) Date of Patent: Sep. 29, 2026

(54) SYSTEM AND METHOD TO PROVIDE A VIRTUAL STORE-FRONT

(71) Applicant: Sociograph Solutions Private Limited, Bangalore (IN)

(72) Inventor: Gopal Ananthakrishnan, Bengaluru (IN)

(73) Assignee: Sociograph Solutions Private Limited, Bangalore (IN)

( * ) Notice: Subject to any disclaimer, the term of this patent is extended or adjusted under 35 U.S.C. 154(b) by 165 days.

(21) Appl. No.: 18/264,546

(22) PCT Filed: Feb. 3, 2022

(86) PCT No.: PCT/IN2022/050089
§ 371 (c)(1),
(2) Date: Aug. 7, 2023

(87) PCT Pub. No.: WO2022/168118
PCT Pub. Date: Aug. 11, 2022

(65) Prior Publication Data

US 2024/0046341 A1 Feb. 8, 2024

(30) Foreign Application Priority Data

Feb. 6, 2021 (IN) ............................. 202141005145

(51) Int. Cl.
*G06Q 30/0601* (2023.01)
*G06F 3/01* (2006.01)
(Continued)

(52) U.S. Cl.
CPC ......... *G06Q 30/0643* (2013.01); *G06F 3/011* (2013.01); *G06F 3/017* (2013.01);
(Continued)

(58) Field of Classification Search
CPC ..... G06Q 30/0643; G06F 3/011; G06F 3/017; G06T 13/205; G06T 13/40; G06T 2200/24; G10L 13/10
See application file for complete search history.

(56) References Cited

U.S. PATENT DOCUMENTS

RE34,476 E * 12/1993 Norwood ............ G06F 3/04883 715/251
5,347,295 A * 9/1994 Agulnick .............. G06F 1/1643 715/863
(Continued)

*Primary Examiner* — Nicholas Augustine
(74) *Attorney, Agent, or Firm* — Spencer Fane, LLP

(57) ABSTRACT

The various embodiments herein provide a system and method that enables a buyer to have a conversation about the purchase of a non-commoditized product, where the product is complicated and has several configurations to choose when the buyer tries to make a purchase. The embodiments herein enable the sales of products in a virtual shopping-space. The embodiments enable the buyer to interact with the product in a 3D virtual space and choose a preferred configuration using one of many controllers present in the system. The buyer also receives advice and recommendation from the virtual avatar about the available options or explanation about the benefits of one product or configuration over the other. Once the recommendation is received, the user is enabled to provide feedback either through voice commands or through a feedback controller about the recommendation made by the system.

7 Claims, 3 Drawing Sheets

(51) Int. Cl.
*G06T 13/20* (2011.01)
*G06T 13/40* (2011.01)
*G10L 13/10* (2013.01)

(52) U.S. Cl.
CPC ............ *G06T 13/205* (2013.01); *G06T 13/40* (2013.01); *G10L 13/10* (2013.01); *G06T 2200/24* (2013.01)

(56) References Cited

U.S. PATENT DOCUMENTS

| | | | | | |
|---|---|---|---|---|---|
| 5,347,477 | A * | 9/1994 | Lee | G06F 1/1656 715/236 |
| 5,389,745 | A * | 2/1995 | Sakamoto | G06F 3/04883 382/297 |
| 5,502,803 | A * | 3/1996 | Yoshida | G06F 40/166 715/201 |
| 5,583,543 | A * | 12/1996 | Takahashi | G06F 3/038 345/173 |
| 5,652,806 | A * | 7/1997 | Friend | G06V 30/1444 382/175 |
| 5,737,443 | A * | 4/1998 | Guzik | G06V 30/32 382/311 |
| 5,798,752 | A * | 8/1998 | Buxton | G06F 3/038 345/157 |
| 5,828,360 | A * | 10/1998 | Anderson | G06F 3/0482 345/902 |
| 5,862,256 | A * | 1/1999 | Zetts | G06V 30/347 382/229 |
| 5,864,635 | A * | 1/1999 | Zetts | G06F 3/04883 382/229 |
| 5,903,666 | A * | 5/1999 | Guzik | G06F 3/04883 382/311 |
| 5,981,884 | A * | 11/1999 | Sato | G06V 30/1423 178/19.03 |
| 6,088,481 | A * | 7/2000 | Okamoto | G06F 3/0488 382/189 |
| 6,226,404 | B1 * | 5/2001 | Ikebata | G06V 30/333 382/187 |
| 6,323,859 | B1 * | 11/2001 | Gantt | G06F 30/00 345/419 |
| 6,408,092 | B1 * | 6/2002 | Sites | G06F 3/04886 345/169 |
| 6,462,733 | B1 * | 10/2002 | Murakami | G06F 3/033 345/184 |
| 6,952,284 | B2 * | 10/2005 | Andrews | G06K 15/00 358/1.8 |
| 7,508,377 | B2 * | 3/2009 | Pihlaja | G06F 3/0487 345/161 |
| 8,405,604 | B2 * | 3/2013 | Pryor | A63F 13/52 345/173 |
| 8,514,221 | B2 * | 8/2013 | King | G06F 3/04883 345/157 |
| 9,104,271 | B1 * | 8/2015 | Adams | G06F 3/0233 |
| 9,304,652 | B1 * | 4/2016 | Lundin | G06F 3/14 |
| 9,996,797 | B1 * | 6/2018 | Holz | G06F 3/011 |
| 10,140,820 | B1 * | 11/2018 | Zalewski | G06Q 20/12 |
| 10,168,873 | B1 * | 1/2019 | Holz | G06F 3/011 |
| 10,250,868 | B1 * | 4/2019 | Arnold | H04N 23/60 |
| 10,291,862 | B1 * | 5/2019 | Liberato | H04N 7/181 |
| 10,559,019 | B1 * | 2/2020 | Beauvais | G06Q 30/0625 |
| 10,943,407 | B1 * | 3/2021 | Morgan | G06T 19/006 |
| 10,970,907 | B1 * | 4/2021 | Albuz | G06F 18/2113 |
| 11,232,645 | B1 * | 1/2022 | Roche | G06V 20/20 |
| 11,714,518 | B2 * | 8/2023 | Gharpuray | G06F 3/04815 345/423 |
| 12,131,371 | B2 * | 10/2024 | Bleicher | G06F 16/00 |
| 12,211,076 | B2 * | 1/2025 | Bleicher | G06Q 30/0621 |
| 2005/0195156 | A1 * | 9/2005 | Pihlaja | G06F 3/0338 345/156 |
| 2006/0187196 | A1 * | 8/2006 | Underkoffler | G06F 3/017 345/156 |
| 2008/0122786 | A1 * | 5/2008 | Pryor | A63F 13/00 345/156 |
| 2009/0031240 | A1 * | 1/2009 | Hildreth | G06F 3/0236 715/823 |
| 2009/0285483 | A1 * | 11/2009 | Guven | G06Q 30/016 345/473 |
| 2010/0053151 | A1 * | 3/2010 | Marti | G06F 3/1446 340/407.1 |
| 2010/0149096 | A1 * | 6/2010 | Migos | G06F 3/0425 345/158 |
| 2010/0164946 | A1 * | 7/2010 | Hyndman | A63F 13/10 345/173 |
| 2010/0169796 | A1 * | 7/2010 | Lynk | H04L 67/131 715/757 |
| 2010/0234094 | A1 * | 9/2010 | Gagner | G07F 17/32 463/20 |
| 2012/0249429 | A1 * | 10/2012 | Anderson | G06F 3/0304 345/173 |
| 2012/0268364 | A1 * | 10/2012 | Minnen | G06F 3/017 382/103 |
| 2012/0275686 | A1 * | 11/2012 | Wilson | G06T 17/00 382/154 |
| 2012/0290950 | A1 * | 11/2012 | Rapaport | H04L 12/1818 715/753 |
| 2013/0120297 | A1 * | 5/2013 | Merritt | A61B 5/0059 345/173 |
| 2013/0271457 | A1 * | 10/2013 | Haswell | G06T 19/003 345/420 |
| 2015/0070351 | A1 * | 3/2015 | Tarquini | G06T 17/20 345/419 |
| 2015/0199022 | A1 * | 7/2015 | Gottesman | G06V 40/28 382/103 |
| 2015/0348551 | A1 * | 12/2015 | Gruber | G10L 15/1822 704/235 |
| 2015/0355805 | A1 * | 12/2015 | Chandler | G06F 3/04817 |
| 2017/0177087 | A1 * | 6/2017 | Lerner | G06F 3/017 |
| 2017/0220361 | A1 * | 8/2017 | Sharma | G06F 3/04817 |
| 2017/0262154 | A1 * | 9/2017 | Black | G06F 3/012 |
| 2018/0047093 | A1 * | 2/2018 | High | G06F 1/1652 |
| 2019/0108686 | A1 * | 4/2019 | Spivack | G06Q 30/0277 |
| 2019/0251622 | A1 * | 8/2019 | Wiedmeyer | G06Q 30/0623 |
| 2019/0266806 | A1 * | 8/2019 | Aluru | G06T 13/40 |
| 2021/0004076 | A1 * | 1/2021 | Schweet | G06F 3/011 |
| 2021/0004137 | A1 * | 1/2021 | Oser | G06Q 30/0601 |
| 2022/0172710 | A1 * | 6/2022 | Brady | G06F 16/3329 |

* cited by examiner

SYSTEM AND METHOD TO PROVIDE A VIRTUAL STORE-FRONT

CROSS-REFERENCE TO RELATED APPLICATIONS

The embodiments herein claim the priority of the Indian Provisional Patent Application filed on Feb. 6 2021, with the number 202141005145 and titled, "SYSTEM AND METHOD TO PROVIDE A VIRTUAL STORE-FRONT", and subsequently filed as a PCT application on Feb. 3 2022 with the number PCT/IN2022/050089, the contents of which are incorporated herein by the way of reference.

BACKGROUND

Technical Field

The embodiments herein are generally related to three-dimensional virtual reality and artificial intelligence technologies. The embodiments herein are particularly related to a real-time deployment of an artificial intelligence agent rendered in a three-dimensional virtual scene and providing a three-dimensional virtual space. The embodiments herein are more specifically related to a system and a method for providing a three-dimensional, virtual and interactive artificial intelligence entity for enabling the sales of products in a virtual shopping-space or marketplace. The embodiments herein are more also related to system and method for enabling the creation of a three-dimensional, virtual and interactive artificial intelligence entity, also referred to as a 'virtual avatar', to mimic a human salesperson within a three-dimensional virtual space that mimics a real brick-and-mortar store.

Description of the Related Art

As more aspects of commerce and selling are moving online, complex products that need an exchange of information between the salesperson and the customer require a process of negotiation on the features of the product and possibly the price. In the absence of physical proximity/presence of the product, the process of purchasing requires the presence of a virtual three-dimensional representation of the product, such as a house or a car. Only when the potential purchaser is provided with an ability to converse with a salesperson and interact virtually with the product in real-time a successful sale is possible in a three-dimensional and virtual marketplace.

Currently, there are no systems available for provide a real-time interactive virtual three-dimensional experience to a potential buyer for interacting with a product, where the product has multiple configurations or versions and cannot be explained in a simplified manner such as a banner or flyer. There are no current solutions to enable a real-time virtual experience of purchasing a product without missing out on any of the real experience of purchasing a product in a physical store.

Thus, there is a need for a system and method to enable a virtual store-front along with a virtual avatar to mimic a human salesperson within a three-dimensional virtual space that mimics a real brick-and-mortar store. There is also a need for a system and method for enabling a buyer to interact with a virtual product in a virtual three-dimensional space and enable the interactive experience to be as close to a physical interaction experience.

The above-mentioned shortcomings, disadvantages and problems are addressed herein, and which will be understood by reading and studying the following specification.

OBJECT OF THE EMBODIMENTS HEREIN

The primary object of the embodiments herein is to provide a system and a method for providing a three-dimensional, virtual, and interactive artificial intelligence entity for enabling the sales of products in a virtual shopping-space or marketplace.

Another object of the embodiments herein is to provide a system and a method for creating a three-dimensional virtual store-front with a three-dimensional virtual avatar.

Yet another object of the embodiments herein is to provide a system and a method replacing the process of sale of complex products in a real store and a real salesperson with a three-dimensional store front and three-dimensional virtual avatar.

Yet another object of the embodiments herein is to enable a buyer to interact with a virtual product in a virtual three-dimensional space and enable the interactive experience to be as close to a physical interaction experience.

These and other objects and advantages of the embodiments herein will become readily apparent from the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a system and a method for providing a three-dimensional, virtual, and interactive artificial intelligence entity for enabling the sales of products in a virtual shopping-space or marketplace. The embodiments also provide a system and a method for creating a three-dimensional virtual store-front with a three-dimensional virtual avatar.

According to one embodiment herein, a method is provided for moving physical brick-and-mortar stores and physical locations where sales activities take place, to virtual locations that allow a real-time interaction between the buyer and the virtual 3D space.

According to one embodiment herein, a system is provided for enabling a virtual store-front. The system comprises a three-dimensional (3D) virtual products module, the three-dimensional virtual avatar, a sales intelligence module, a virtual product controller, a virtual avatar controller and a product-preference intelligence module. The 3D virtual products are showcased in a 3D virtual space that is rendered in a digital display device, wherein the 3D virtual products are interactive and provide a view of the products from different angles. The rendering also enables changing the color or design or shape or size of the products according to customization preferences. The interactions between the buyer and the 3D products are captured through a plurality of methods including clicks, touches, finger actions, voice commands or any other verbal or non-verbal communication methods that are recognized by suitable sensors present in the digital display device or any other device connected to the digital display device through wired or wireless means.

According to one embodiment herein, the inventions is enabled for voice-based conversations between a buyer and a virtual avatar of the salesperson, wherein the virtual avatar is either a three-dimensional representation that mimics a remotely located human salesperson in real-time, or an artificial intelligence entity configured to mimic a human salesperson. The virtual avatar is configured to explain all the features of a product that interests the buyer without any limitation of the type of the product. The virtual avatar comprises a conversational module and it is connected to the sales intelligence module, wherein the sales intelligence module comprises preset information related to the products available on the virtual store-front, including data on the features of the product such as material, durability etc., and attributes of the product such as colour, texture etc. The embodiment also comprises preset information on the preferences of buyers specific to each product. The system comprises an artificial intelligence module that is configured to enable the virtual avatar to understand the preferences and expectations of buyers pertaining to a product through verbal and non-verbal communication with the buyer, and enable the buyer to choose the right product by making suitable suggestions and demonstrations of products based on preset information and updating the information on the preferences and expectations of the buyer based on the real-time communication between the communication and the virtual avatar.

According to one embodiment herein, a plurality of controllers is configured in the system that provides a three-dimensional virtual store-front with a three-dimensional virtual avatar. A first controller is an exploratory controller, which enables a human user to navigate the three-dimensional virtual store-front through an inbuilt or an add-on computing device that receives touch-based or gesture-based inputs such as clicks, taps or swipes on specialized locations on the computing device. A second controller is a product or specification selector, which is configured to enable a user to directly interact with a virtual product or a supporting locations/environment within the three-dimensional rendering to choose a product, or a product attribute such as colour or size. A third controller is a voice-based controller, which enables the buyer to converse with the virtual avatar by through a microphone module in the system that receives the voice signals of the buyer, and an artificial intelligence module that is configured to understand the buyer's preferences through natural language processing. The third controller is also configured to be implemented as an additional enabler for performing the functions of the first controller and the second controller. The third controller is also configured to providing a voice-based information from the virtual avatar to the buyer based through speakers comprised in the system or an external add-on device.

According to one embodiment herein, the controllers are configured to be processed through a product preference engine. The product preference engine is configured to assimilate knowledge from all the controllers about the buyer and identify the suitable product and their configurations to match the buyer's preferences. The product preference engine comprises information on previous preferences of users and ties it with the current set of interactions. Based on the inferences generated by the product preference engine, the virtual avatar is configured to provide a suggestion on a product or product configuration that is preferred by the buyer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
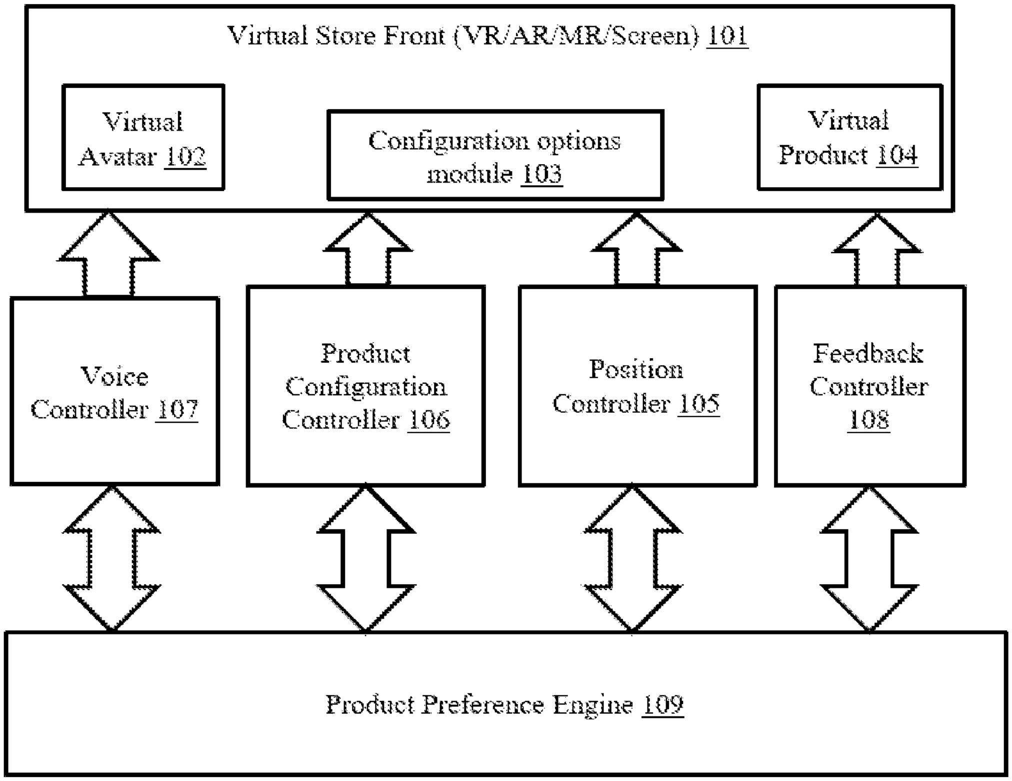
FIG. 1 illustrates a system for rendering a virtual store-front that comprises a virtual avatar, according to one embodiment herein.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide a system and a method for providing a three-dimensional, virtual, and interactive artificial intelligence entity for enabling the sales of products in a virtual shopping-space or marketplace. The embodiments also provide a system and a method for creating a three-dimensional virtual store-front with a three-dimensional virtual avatar.

According to one embodiment herein, a system is enabled for providing a three-dimensional virtual environment configured in a digital virtual three-dimensional space that enables a real-time interaction between a human buyer and a three-dimensional virtual store-front. The system comprises a virtual store front, a product preference engine, a plurality of controllers and a communication module. The virtual store front is a three-dimensional virtual environment configured in a computing module. The virtual store front further comprises a digital display device, a camera module, a virtual avatar, a configuration options module and a virtual product module. The product preference engine further comprises an affinity engine and a plurality of databases including an interaction database, a purchase database, a feedback database, a user database and a product database. The plurality of controllers includes a voice controller, a product configuration controller, a position controller and a feedback controller. The communication module enables wired and wireless communication between the virtual store front, the product preference engine and the plurality of controllers. The communication module also enables communication with a plurality of remote computing devices.

According to one embodiment herein, the virtual product module comprises a digital virtual representation of a plurality of products available in the store front. The virtual product module is accessed by the human user through the digital display device that is configured with digital input-output capabilities. The configuration options module is enabled to provide an optimum configuration of the virtual store front by defining the parameters of the virtual avatar, virtual product module and the digital display device depending on preset rules, configuration settings chosen in real-time by the human user and the type of products provided in the virtual product module.

According to one embodiment herein, the virtual avatar is a digital android configured with Artificial Intelligence capabilities and provided with the ability to communicate through gestures, human-like expressions, textual instant messaging and verbally in a plurality of languages. The virtual avatar is further configured with: a text-to-voice module for converting a text into a voice-based audio output; an emphasis estimator that is configured to estimate the emphasis to be provided on specific words or phrases generated by the text-to-voice module based on the information to be provided to the human user and to bring the attention of the human user to the important parts of the audio output; a lip-and-jaw movement generator for estimating and rendering a human-like movement of the lips and jaw of the virtual avatar depending on the output of the text-to-voice module and the emphasis generator; a facial expression generator for estimating and rendering a human-like facial emotional expressions of the virtual avatar depending on the output of the text-to-voice module and the emphasis generator; a gesture generator for estimating and rendering a human-like hand gestures of the virtual avatar depending on the output of the text-to-voice module, the emphasis generator and the facial expression generator; and, a movement-and-position generator for enabling a movement of the virtual avatar based on the location of a virtual product in the virtual store front with which the virtual avatar interacts.

According to one embodiment herein, the plurality of controllers include: a product configuration controller which is configured to receive a plurality of audio, visual, haptic and textual inputs digitally to provide a plurality of configurations of virtual products in the virtual store front; a voice controller which is configured to receive voice-based audio inputs from a human user and identify the requirements of the human user and contextually provide inputs to the product configuration controller to accordingly configure virtual product; a position controller which is configured to control the position of the camera module with respect to the position of the user and the virtual three-dimensional space, and identify the relevance of the position and proximity of the human user to a plurality of preset elements to capture the preferences of the human user; and, a feedback controller which is configured to receive the feedback from the human user on the virtual products in audio, visual, haptic and textual means to infer the preference of the user in real-time.

According to one embodiment herein, the product preference engine is configured to present a plurality of virtual products to the human user by rendering them on the digital display device. The product preference engine is configured to process the information from the product configuration controller and the feedback controller to decide the priority of virtual products rendered to the human user.

According to one embodiment herein, the product preference engine comprises a plurality of databases, including: an interaction database that comprises information on all the interactions of the human user using one or more of the plurality of controllers; a purchase database that comprises the information of all made by human users on the virtual store front; a feedback database that comprises all the feedbacks provided by human users on the virtual products; a user database that comprises information on all the human users who used the virtual storefront; and, a product database that comprises information about all the virtual products and a plurality of attributes and specifications of the virtual products.

According to one embodiment herein, the product preference engine comprises an affinity engine that is configured to utilize the information in the plurality of databases to identify the affinity and preferences of a human user to a plurality of virtual products.

According to one embodiment herein, a method is provided for enabling a three-dimensional virtual environment configured in a digital virtual three-dimensional space that enables a real-time interaction between a human buyer and a three-dimensional virtual store-front. The method includes: rendering a plurality of virtual products on a virtual store front to a human user; triggering a virtual avatar in the virtual store front to provide audio, visual and textual information relevant to the virtual products; gathering information on the human user's interest and preferences about the virtual products that are rendered through an analysis of the audio, visual, textual, gestural, haptic and positional inputs and cues from the human user; processing the gathered information along with preset data and information stored in a plurality of databases on a product preference generator, and selecting a suitable plurality of virtual products for the human user; rendering the selected suitable plurality of virtual products on the virtual store front; triggering a virtual avatar to provide audio, visual and textual information relevant to the selected suitable plurality of virtual products; receiving a feedback from the human user through a feedback controller; and, repeating the rendering of suitable virtual products till the user confirms a final selection and exits the virtual store front.

According to one embodiment herein, a method is provided for moving physical brick-and-mortar stores and physical locations where sales activities take place, to virtual locations that allow a real-time interaction between the buyer and the virtual 3D space.

According to one embodiment herein, a system is provided for enabling a virtual store-front. The system comprises a three-dimensional (3D) virtual products module, the three-dimensional virtual avatar, a sales intelligence module, a virtual product controller, a virtual avatar controller and a product-preference intelligence module. The 3D virtual products are showcased in a 3D virtual space that is rendered in a digital display device, wherein the 3D virtual products are interactive and provide a view of the products from different angles. The rendering also enables changing the color or design or shape or size of the products according to customization preferences. The interactions between the buyer and the 3D products are captured through a plurality of methods including clicks, touches, finger actions, voice commands or any other verbal or non-verbal communication methods that are recognized by suitable sensors present in the digital display device or any other device connected to the digital display device through wired or wireless means.

According to one embodiment herein, the inventions is enabled for voice-based conversations between a buyer and a virtual avatar of the salesperson, wherein the virtual avatar is either a three-dimensional representation that mimics a remotely located human salesperson in real-time, or an artificial intelligence entity configured to mimic a human salesperson. The virtual avatar is configured to explain all the features of a product that interests the buyer without any limitation of the type of the product. The virtual avatar comprises a conversational module and it is connected to the sales intelligence module, wherein the sales intelligence module comprises preset information related to the products available on the virtual store-front, including data on the features of the product such as material, durability etc., and attributes of the product such as colour, texture etc. The embodiment also comprises preset information on the preferences of buyers specific to each product. The system comprises an artificial intelligence module that is configured to enable the virtual avatar to understand the preferences and expectations of buyers pertaining to a product through verbal and non-verbal communication with the buyer, and enable the buyer to choose the right product by making suitable suggestions and demonstrations of products based on preset information and updating the information on the preferences and expectations of the buyer based on the real-time communication between the communication and the virtual avatar.

According to one embodiment herein, a plurality of controllers is configured in the system that provides a three-dimensional virtual store-front with a three-dimensional virtual avatar. A first controller is an exploratory controller, which enables a human user to navigate the three-dimensional virtual store-front through an inbuilt or an add-on computing device that receives touch-based or gesture-based inputs such as clicks, taps or swipes on specialized locations on the computing device. A second controller is a product or specification selector, which is configured to enable a user to directly interact with a virtual product or a supporting locations/environment within the three-dimensional rendering to choose a product, or a product attribute such as colour or size. A third controller is a voice-based controller, which enables the buyer to converse with the virtual avatar by through a microphone module in the system that receives the voice signals of the buyer, and an artificial intelligence module that is configured to understand the buyer's preferences through natural language processing. The third controller is also configured to be implemented as an additional enabler for performing the functions of the first controller and the second controller. The third controller is also configured to providing a voice-based information from the virtual avatar to the buyer based through speakers comprised in the system or an external add-on device.

According to one embodiment herein, the controllers are configured to be processed through a product preference engine. The product preference engine is configured to assimilate knowledge from all the controllers about the buyer and identify the suitable product and their configurations to match the buyer's preferences. The product preference engine comprises information on previous preferences of users and ties it with the current set of interactions. Based on the inferences generated by the product preference engine, the virtual avatar is configured to provide a suggestion on a product or product configuration that is preferred by the buyer.

FIG. 1 illustrates a system for rendering a virtual store-front that comprises a virtual avatar. The system comprises Virtual Store Front (VR/AR/MR/Screen) 101, Virtual Avatar 102, Configuration options module 103, Virtual Product 104, Position Controller 105, Product Configuration Controller 106, Voice Controller 107, Feedback Controller 108 and Product Preference Engine 109.

Figure 2:
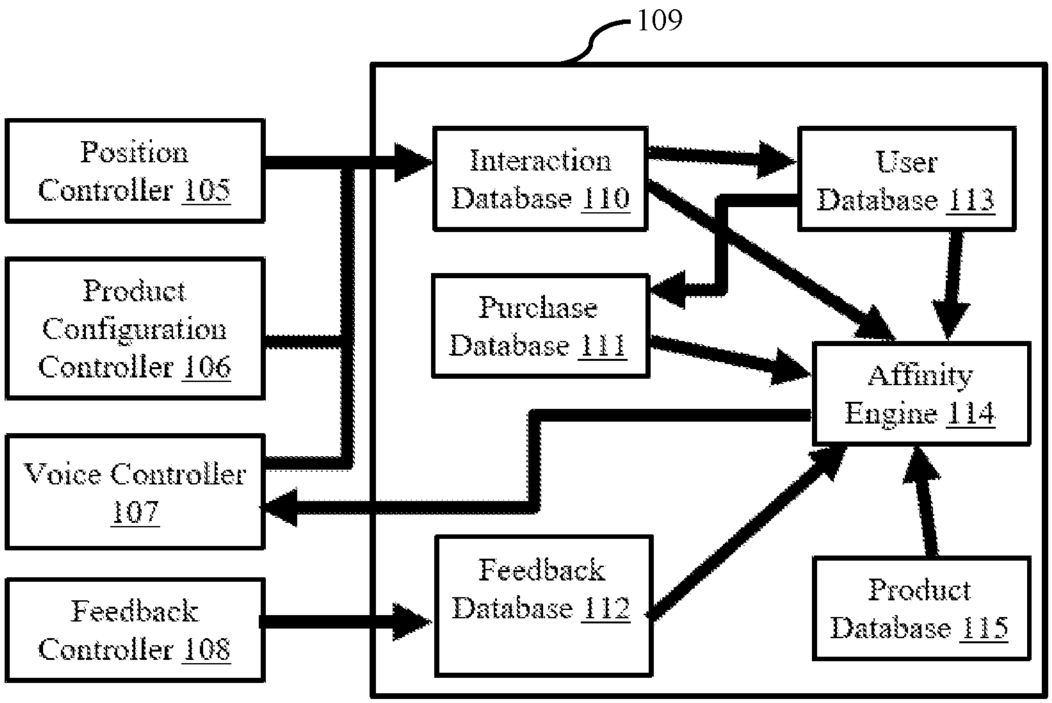
FIG. 2 illustrates a block diagram of a product preference engine, according to one embodiment herein.

FIG. 2 illustrates a block diagram of a product preference engine. The product preference engine comprises Interaction Database 110, Purchase Database 111, Feedback Database 112, User Database 113, Affinity Engine 114 and Product Database 115.

Figure 3:
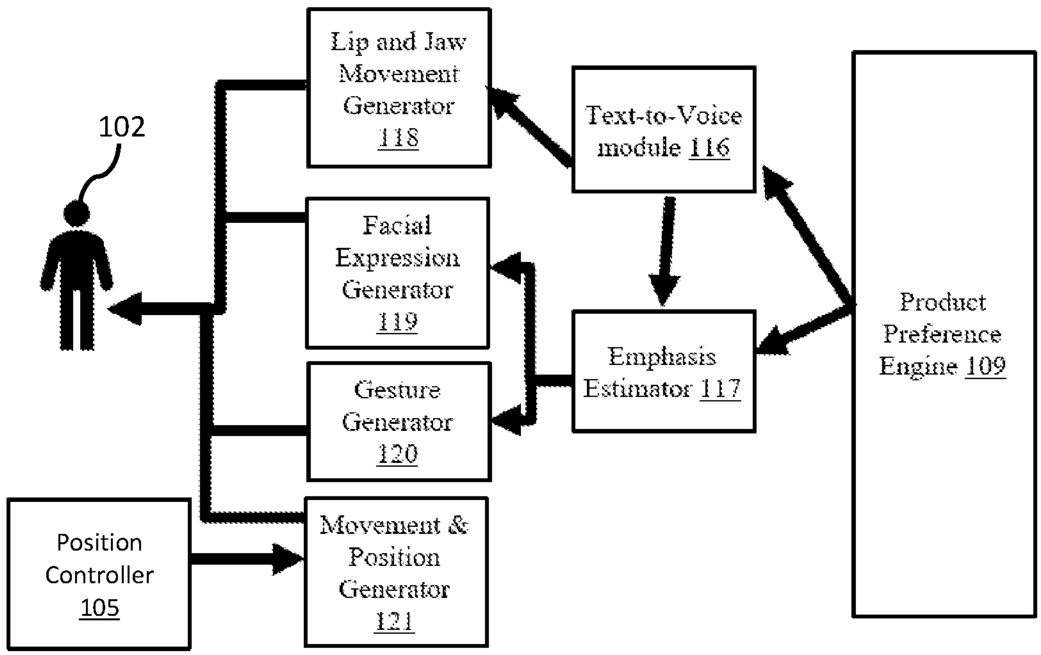
FIG. 3 illustrates a block diagram of the virtual avatar, according to one embodiment herein.

FIG. 3 illustrates a block diagram of the virtual avatar. The virtual avatar comprises Text-to-Voice module 116, Emphasis Estimator 117, Lip and Jaw Movement Generator 118, Facial Expression Generator 119, Gesture Generator 120 and Movement & Position Generator 121.

The various embodiments herein provide a system and a method for providing a three-dimensional, virtual, and interactive artificial intelligence entity for enabling the sales of products in a virtual shopping-space or marketplace. The embodiments also provide a system and a method for creating a three-dimensional virtual store-front with a three-dimensional virtual avatar. The embodiments herein move the process of selling complex products from a physical brick-and-mortar shop to a virtual system. The embodiments herein enable making sales 24×7 without the requirement of a salesperson, even for complex products which require product interaction and explanation from a salesperson. The embodiments herein increase the number of users who experience the product without travelling to a physical shop. While e-commerce helps sales of commoditized products 24×7 and without visiting a physical store, the embodiments herein allow the sale of complex products with many configurations, and which require a detailed conversation and explanation before the sales is made.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

The invention claimed is:

1. A system for providing a three-dimensional virtual environment configured in a digital virtual three-dimensional space that enables a real-time interaction between a human buyer and a three-dimensional virtual store-front, the system comprising:

a virtual store front that comprises a three-dimensional virtual environment configured in a computing module, and wherein the virtual store front further comprises a digital display device, a camera module, a virtual avatar, a configuration options module and a virtual product module;

a product preference engine that comprises an affinity engine and a plurality of databases including an interaction database, a purchase database, a feedback database, a user database and a product database, wherein the product preference engine is configured to prioritize virtual products for rendering based on accumulated user preference data;

a plurality of controllers comprising a voice controller, a product configuration controller, a position controller and a feedback controller, wherein the feedback controller is configured to receive explicit preference signals from the human user regarding rendered virtual products in audio, visual, haptic and textual means, communicate those preference signals to the product preference engine to infer the preference of the user in real-time and update the priority of virtual products to be rendered; and a communication module that enables wired and wireless communication between the virtual store front, the product preference engine and the plurality of controllers, and wherein the communication module also enables communication with a plurality of remote computing devices.

2. The system according to claim 1, wherein the virtual product module comprises a digital virtual representation of a plurality of products available in the store front, and wherein the virtual product module is accessed by the human user through the digital display device that is configured with digital input-output capabilities, and wherein the configuration options module is enabled to provide an optimum configuration of the virtual store front by defining the parameters of the virtual avatar, virtual product module and the digital display device depending on preset rules, configuration settings chosen in real-time by the human user and the type of products provided in the virtual product module.

3. The system according to claim 1, wherein the virtual avatar is a digital android configured with Artificial Intelligence capabilities and provided with the ability to communicate through gestures, human-like expressions, textual instant messaging and verbally in a plurality of languages, and wherein the virtual avatar is further configured with: a text-to-voice module for converting a text into a voice-based audio output; an emphasis estimator that is configured to estimate the emphasis to be provided on specific words or phrases generated by the text-to-voice module based on information to be provided to the human user and to bring the attention of the human user to the important parts of the audio output; a lip-and-jaw movement generator for estimating and rendering a human-like movement of the lips and jaw of the virtual avatar depending on the output of the text-to-voice module and the emphasis generator; a facial expression generator for estimating and rendering a human-like facial emotional expressions of the virtual avatar depending on the output of the text-to-voice module and the emphasis generator; a gesture generator for estimating and rendering a human-like hand gestures of the virtual avatar depending on the output of the text-to-voice module, the emphasis generator and the facial expression generator; and, a movement-and-position generator for enabling a movement of the virtual avatar based on the location of a virtual product in the virtual store front with which the virtual avatar interacts.

4. The system according to claim 1, wherein the plurality of controllers include: a product configuration controller which is configured to receive a plurality of audio, visual, haptic and textual inputs digitally to provide a plurality of configurations of virtual products in the virtual store front; a voice controller which is configured to receive voice-based audio inputs from a human user and identify the requirements of the human user and contextually provide inputs to the product configuration controller to accordingly configure virtual product; and a position controller which is configured to control the position of the camera module with respect to the position of the user and the virtual three-dimensional space, and identify the relevance of the position and proximity of the human user to a plurality of preset elements to capture the preferences of the human user.

5. The system according to claim 1, wherein the product preference engine is configured to present a plurality of virtual products to the human user by rendering them on the digital display device, and wherein the product preference engine is configured to process information from the product configuration controller and the feedback controller to decide the priority of virtual products rendered to the human user.

6. The system according to claim 1, wherein the product preference engine comprises a plurality of databases, including: an interaction database that comprises information on all the interactions of the human user using one or more of the plurality of controllers; a purchase database that comprises the information of all made by human users on the virtual store front; a feedback database that comprises all the feedbacks provided by human users on the virtual products; a user database that comprises information on all the human users who used the virtual storefront; and, a product database that comprises information about all the virtual products and a plurality of attributes and specifications of the virtual products.

7. The system according to claim 1, wherein the product preference engine comprises an affinity engine that is configured to utilize information in the plurality of databases to identify the affinity and preferences of a human user to a plurality of virtual products.

* * * * *